US012601436B2

(12) United States Patent
Coulson et al.

(10) Patent No.: US 12,601,436 B2
(45) Date of Patent: Apr. 14, 2026

(54) GENDERLESS ASEPTIC CONNECTOR

(71) Applicant: WilMarc Holdings, LLC, Fort Collins, CO (US)

(72) Inventors: Marcia Coulson, Fort Collins, CO (US); William A. Coulson, Fort Collins, CO (US); Paul C. Ciccone, Wellington, CO (US)

(73) Assignee: WilMarc Holdings, LLC, Fort Collins, CO (US)

( * ) Notice: Subject to any disclaimer, the term of this patent is extended or adjusted under 35 U.S.C. 154(b) by 168 days.

(21) Appl. No.: 18/385,157

(22) Filed: Oct. 30, 2023

(65) Prior Publication Data

US 2025/0137566 A1     May 1, 2025

(51) Int. Cl.
*F16L 37/367*          (2006.01)
*F16L 37/098*          (2006.01)

(52) U.S. Cl.
CPC ........... *F16L 37/367* (2013.01); *F16L 37/098* (2013.01)

(58) Field of Classification Search
CPC .... F16L 37/367; F16L 37/098; F16L 2201/44
See application file for complete search history.

(56) References Cited

U.S. PATENT DOCUMENTS

| | | | |
|---|---|---|---|
| 964,310 A | 7/1910 | Perazio | |
| 2,208,286 A | 7/1940 | Berger | |
| 2,218,318 A | 10/1940 | Pfauser | |
| 2,263,293 A | 11/1941 | Ewald | |
| 2,304,390 A | 12/1942 | Wolfram | |
| 2,451,218 A | 10/1948 | Hengst | |
| 2,456,045 A | 12/1948 | Brock | |
| 2,545,796 A | 3/1951 | Scheiwer | |

(Continued)

FOREIGN PATENT DOCUMENTS

| | | |
|---|---|---|
| CA | 1 021 656 | 11/1977 |
| CA | 1084551 | 8/1980 |

(Continued)

OTHER PUBLICATIONS

Eldon James. Introducing SeriesLock™ the Spring-Free Flow Path Quick Disconnect Coupler (with video). Website, https://www.eldonjames.com/serieslock-quick-disconnect-coupler/, originally downloaded Jun. 6, 2018, 5 pages.

(Continued)

*Primary Examiner* — Patrick C Williams
(74) *Attorney, Agent, or Firm* — CR MILES P.C.; Craig R. Miles

(57)          ABSTRACT

A genderless aseptic connector system in which a plurality of connectors of substantially identical configuration each include connector housing having an internal surface defining a fluid passage between a connector end and connector housing face having an annular seal and a membrane positioned to cover the annular seal, wherein, upon engagement of a first connector housing and a second connector housing along a common juncture, a first membrane and a second membrane when correspondingly removed from a first annular seal coupled to the first connector housing and a second annular seal coupled to the second connector housing allow the first annular seal to engage the second annular seal to provide a sterile fluid passage.

20 Claims, 10 Drawing Sheets

(56)  References Cited

U.S. PATENT DOCUMENTS

| | | | |
|---|---|---|---|
| 2,648,548 A | | 8/1953 | Scheiwer |
| 2,777,716 A | | 1/1957 | Gray |
| 2,805,089 A | | 9/1957 | Hansen |
| 2,854,259 A | | 9/1958 | Clark |
| 2,951,713 A | | 9/1960 | Hoffstrom |
| 3,279,497 A | | 10/1966 | Norton et al. |
| 3,291,152 A | | 12/1966 | Comer |
| 3,382,892 A | | 5/1968 | Cerbin |
| 3,460,801 A | | 8/1969 | Norton |
| 3,592,231 A | | 7/1971 | Lamb |
| 3,719,194 A | | 3/1973 | Anderson et al. |
| 3,758,137 A | * | 9/1973 | Kershaw ............. F16L 37/252 |
| | | | 285/379 |
| 3,847,413 A | | 11/1974 | Gurley et al. |
| 3,916,929 A | | 11/1975 | Brown |
| 4,019,512 A | | 4/1977 | Tenczar |
| 4,187,846 A | | 2/1980 | Lolachi et al. |
| 4,220,174 A | | 9/1980 | Spitz |
| 4,415,085 A | | 11/1983 | Clarke et al. |
| 4,436,125 A | | 3/1984 | Blenkush |
| 4,500,118 A | | 2/1985 | Blenkush |
| 4,541,457 A | | 9/1985 | Blenkush |
| 4,543,993 A | | 10/1985 | Calvin et al. |
| 4,576,359 A | | 3/1986 | Oetiker |
| 4,625,761 A | | 12/1986 | Uchida et al. |
| 4,630,847 A | | 12/1986 | Blenkush |
| 4,676,778 A | | 6/1987 | Nelson, Jr. |
| 4,703,957 A | | 11/1987 | Blenkush |
| 4,703,958 A | | 11/1987 | Fremy |
| 4,733,692 A | | 3/1988 | Kotake et al. |
| 4,753,268 A | | 6/1988 | Palau |
| 4,819,692 A | | 4/1989 | Olson et al. |
| 4,877,145 A | | 10/1989 | Manner |
| 4,903,995 A | | 2/1990 | Blenkush et al. |
| 4,934,655 A | | 6/1990 | Blenkush et al. |
| 4,946,200 A | | 8/1990 | Blenkush et al. |
| 4,953,592 A | | 9/1990 | Takahashi et al. |
| 4,982,736 A | | 1/1991 | Schneider |
| 5,009,252 A | | 4/1991 | Faughn |
| 5,033,777 A | | 7/1991 | Blenkush |
| 5,052,725 A | | 10/1991 | Meyer et al. |
| 5,076,615 A | | 12/1991 | Sampson |
| 5,104,158 A | | 4/1992 | Meyer et al. |
| 5,137,527 A | | 8/1992 | Miller et al. |
| 5,165,733 A | | 11/1992 | Sampson |
| 5,178,303 A | | 1/1993 | Blenkush et al. |
| D339,417 S | | 9/1993 | Sampson et al. |
| 5,259,894 A | | 11/1993 | Sampson |
| 5,295,339 A | | 3/1994 | Manner |
| 5,316,041 A | | 5/1994 | Ramacier, Jr. et al. |
| 5,353,836 A | | 10/1994 | deCler et al. |
| 5,390,702 A | | 2/1995 | Smith, III |
| D357,307 S | | 4/1995 | Ramacier, Jr. et al. |
| 5,460,413 A | | 10/1995 | Sampson |
| 5,494,074 A | | 2/1996 | Ramacier, Jr. et al. |
| 5,529,085 A | | 6/1996 | Richards et al. |
| D372,093 S | | 7/1996 | Sampson et al. |
| 5,546,985 A | | 8/1996 | Bartholomew |
| D375,160 S | | 10/1996 | Sampson et al. |
| 5,564,752 A | | 10/1996 | Sampson |
| 5,639,064 A | | 6/1997 | deCler et al. |
| D384,731 S | | 10/1997 | Ramacier, Jr. et al. |
| 5,695,221 A | | 12/1997 | Sunderhaus |
| D388,876 S | | 1/1998 | Sampson |
| 5,704,106 A | | 1/1998 | Sampson et al. |
| 5,799,987 A | | 9/1998 | Sampson |
| 5,820,614 A | | 10/1998 | Erskine et al. |
| 5,826,610 A | | 10/1998 | Bodhaine |
| 5,837,180 A | | 11/1998 | Linder et al. |
| 5,845,943 A | | 12/1998 | Ramacier, Jr. et al. |
| 5,848,811 A | | 12/1998 | Sampson |
| 5,848,997 A | | 12/1998 | Erskine et al. |
| 5,869,803 A | | 2/1999 | Noguchi et al. |
| 5,911,403 A | | 6/1999 | deCler et al. |
| 5,937,885 A | | 8/1999 | Sampson |
| 5,938,244 A | | 8/1999 | Meyer |
| 5,975,489 A | | 11/1999 | deCler et al. |
| 6,024,124 A | | 2/2000 | Braun et al. |
| 6,050,297 A | | 4/2000 | Ostrowski et al. |
| 6,082,401 A | | 7/2000 | Braun et al. |
| 6,095,191 A | | 8/2000 | Smith, III |
| 6,146,374 A | | 11/2000 | Erskine et al. |
| 6,161,578 A | | 12/2000 | Braun et al. |
| 6,206,040 B1 | | 3/2001 | Smith, III |
| 6,231,089 B1 | | 5/2001 | deCler et al. |
| 6,382,593 B1 | | 5/2002 | deCler et al. |
| 6,412,829 B1 | | 7/2002 | Persson |
| 6,511,100 B1 | | 1/2003 | Le Clinche |
| 6,557,824 B1 | | 5/2003 | Jenski, Jr. et al. |
| 6,581,907 B1 | | 6/2003 | Kuwabara et al. |
| 6,607,097 B2 | | 8/2003 | Savage et al. |
| 6,626,419 B2 | | 9/2003 | deCler et al. |
| 6,649,829 B2 | | 11/2003 | Garber et al. |
| 6,655,655 B1 | * | 12/2003 | Matkovich ......... A61M 39/1011 |
| | | | 604/905 |
| 6,705,591 B2 | | 3/2004 | deCler |
| 6,848,602 B2 | | 2/2005 | deCler et al. |
| 6,871,669 B2 | | 3/2005 | Meyer et al. |
| D503,778 S | | 4/2005 | Wicks |
| 6,886,803 B2 | | 5/2005 | Mikiya et al. |
| 6,897,374 B2 | | 5/2005 | Garber et al. |
| 6,902,144 B2 | | 6/2005 | deCler |
| 6,916,007 B2 | | 7/2005 | deCler et al. |
| 6,962,275 B2 | | 11/2005 | deCler et al. |
| 6,978,800 B2 | | 12/2005 | deCler et al. |
| 7,080,665 B2 | | 7/2006 | Whall |
| 7,147,627 B2 | | 12/2006 | Kim et al. |
| 7,163,022 B2 | | 1/2007 | Whall |
| 7,210,917 B2 | | 5/2007 | Lai et al. |
| 7,316,424 B2 | | 1/2008 | Kardeis et al. |
| 7,384,783 B2 | | 6/2008 | Kunas et al. |
| 7,394,375 B2 | | 7/2008 | Johnson |
| 7,434,842 B2 | | 10/2008 | Schmidt |
| 7,448,653 B2 | | 11/2008 | Jensen et al. |
| 7,469,472 B2 | | 12/2008 | deCler et al. |
| 7,488,446 B2 | | 2/2009 | Meyer et al. |
| 7,514,025 B2 | | 4/2009 | Hofmann et al. |
| 7,544,191 B2 | | 6/2009 | Peluso et al. |
| 7,546,857 B2 | | 6/2009 | Chadbourne et al. |
| 7,547,047 B2 | | 6/2009 | deCler et al. |
| 7,562,906 B2 | | 7/2009 | Schmidt |
| D602,128 S | | 10/2009 | Williams et al. |
| 7,631,660 B2 | | 12/2009 | deCler et al. |
| 7,647,954 B2 | | 1/2010 | Garber et al. |
| D612,019 S | | 3/2010 | Williams et al. |
| D612,021 S | | 3/2010 | Schmidt |
| 7,695,020 B2 | | 4/2010 | Schmidt |
| 7,708,025 B2 | | 5/2010 | Johnson |
| 7,722,583 B2 | | 5/2010 | Kim et al. |
| 7,757,974 B2 | | 7/2010 | Hofmann et al. |
| 7,770,939 B2 | | 8/2010 | Jensen et al. |
| 7,806,139 B2 | | 10/2010 | Packham et al. |
| 7,828,336 B2 | | 11/2010 | Gammons |
| 7,841,357 B2 | | 11/2010 | Rankin |
| D629,894 S | | 12/2010 | Lombardi, III et al. |
| D630,320 S | | 1/2011 | Lombardi, III et al. |
| 7,875,346 B2 | | 1/2011 | Hofmann et al. |
| 7,878,553 B2 | | 2/2011 | Wicks et al. |
| D634,840 S | | 3/2011 | Lombardi, III et al. |
| 7,901,934 B2 | | 3/2011 | Kunas et al. |
| 7,921,875 B2 | | 4/2011 | Moriiki et al. |
| 7,950,700 B2 | | 5/2011 | Willemstyn et al. |
| D639,398 S | | 6/2011 | Wilhelm |
| 7,954,374 B2 | | 6/2011 | Rankin |
| 7,954,515 B2 | | 6/2011 | Gerst |
| D642,244 S | | 7/2011 | Wilhelm |
| 7,976,072 B2 | | 7/2011 | Parrish |
| D645,547 S | | 9/2011 | Lombardi et al. |
| 8,016,816 B2 | | 9/2011 | Gregory |
| D649,240 S | | 11/2011 | Lewis et al. |
| D649,938 S | | 12/2011 | Erickson et al. |
| D649,939 S | | 12/2011 | Erickson et al. |
| D650,478 S | | 12/2011 | Lewis |
| 8,075,540 B2 | | 12/2011 | Von Dyck et al. |

(56)                 References Cited

U.S. PATENT DOCUMENTS

| | | | |
|---|---|---|---|
| D652,510 S | 1/2012 | Lombardi, III et al. | |
| D652,511 S | 1/2012 | Lombardi, III et al. | |
| D654,573 S | 2/2012 | Lombardi et al. | |
| 8,113,546 B2 | 2/2012 | Jensen et al. | |
| D655,393 S | 3/2012 | Whitaker | |
| 8,162,242 B2 | 4/2012 | Hofmann et al. | |
| 8,187,867 B2 | 5/2012 | Kunas et al. | |
| D663,022 S | 7/2012 | Lombardi, III et al. | |
| 8,235,426 B2 | 8/2012 | Pisula, Jr. et al. | |
| 8,256,803 B2 | 9/2012 | Takahashi | |
| 8,323,255 B2 | 12/2012 | Martino et al. | |
| 8,388,873 B2 | 3/2013 | Hofmann et al. | |
| 8,397,756 B2 | 3/2013 | Packham et al. | |
| 8,448,994 B2 | 5/2013 | Pisula, Jr. et al. | |
| RE44,310 E | 6/2013 | Chadbourne et al. | |
| 8,491,016 B2 | 7/2013 | Williams et al. | |
| 8,596,688 B2 | 12/2013 | Pisula, Jr. et al. | |
| D698,440 S | 1/2014 | Lombardi, III et al. | |
| 8,623,640 B2 | 1/2014 | Kunas et al. | |
| D699,841 S | 2/2014 | Lombardi, III et al. | |
| 8,684,035 B2 | 4/2014 | Bernhard | |
| D712,537 S | 9/2014 | Lombardi et al. | |
| 8,897,756 B2 | 11/2014 | Skog et al. | |
| 8,926,577 B2 | 1/2015 | Nishtala et al. | |
| 8,945,091 B2 | 2/2015 | Williams et al. | |
| D724,703 S | 3/2015 | Downs | |
| 9,027,968 B2 * | 5/2015 | Gerst | A61M 39/20 |
| | | | 251/149.1 |
| 9,046,205 B2 | 6/2015 | Whitaker et al. | |
| 9,157,560 B2 | 10/2015 | Rehder et al. | |
| 9,266,257 B2 | 2/2016 | Hofmann et al. | |
| 9,279,530 B2 | 3/2016 | Schmidt | |
| 9,327,893 B2 | 5/2016 | Steele et al. | |
| 9,364,653 B2 | 6/2016 | Williams et al. | |
| 9,371,921 B2 | 6/2016 | Whitaker | |
| D761,395 S | 7/2016 | Plackner et al. | |
| 9,388,929 B2 | 7/2016 | Lewis et al. | |
| D762,826 S | 8/2016 | Plackner et al. | |
| 9,463,110 B2 | 10/2016 | Nishtala et al. | |
| 9,464,741 B2 | 10/2016 | Lewis et al. | |
| 9,498,800 B2 | 11/2016 | Hofmann et al. | |
| 9,506,590 B2 | 11/2016 | Wilhelm et al. | |
| 9,540,606 B2 | 1/2017 | Kunas et al. | |
| 9,770,581 B2 | 9/2017 | Gerst et al. | |
| 9,879,808 B2 | 1/2018 | Williams et al. | |
| 9,901,729 B2 | 2/2018 | Vigna et al. | |
| 10,173,046 B2 | 1/2019 | Ciccone et al. | |
| 10,213,592 B2 | 2/2019 | Gerst et al. | |
| 10,293,150 B2 | 5/2019 | Ciccone et al. | |
| 10,307,583 B2 | 6/2019 | Williams et al. | |
| 10,350,401 B2 | 7/2019 | Ciccone et al. | |
| 10,449,350 B2 * | 10/2019 | Gebauer | A61M 39/10 |
| 10,486,880 B2 | 11/2019 | Franca et al. | |
| 10,583,281 B2 | 3/2020 | Ciccone et al. | |
| 10,632,297 B2 | 4/2020 | Gerst et al. | |
| 10,640,741 B2 | 5/2020 | Kunas et al. | |
| 10,871,250 B2 | 12/2020 | Williams et al. | |
| 11,357,963 B2 | 6/2022 | Williams et al. | |
| 11,591,556 B2 | 2/2023 | Kunas et al. | |
| 2001/0035220 A1 | 11/2001 | Russell | |
| 2002/0011730 A1 | 1/2002 | Stickan | |
| 2002/0014608 A1 | 2/2002 | deCler et al. | |
| 2002/0024216 A1 | 2/2002 | Rose et al. | |
| 2002/0063427 A1 | 5/2002 | Schiemann et al. | |
| 2002/0074533 A1 | 6/2002 | DeCler et al. | |
| 2002/0101076 A1 | 8/2002 | Barrier | |
| 2002/0129858 A1 | 9/2002 | Meyer et al. | |
| 2002/0170731 A1 | 11/2002 | Garber et al. | |
| 2002/0190453 A1 | 12/2002 | Wilhelm et al. | |
| 2003/0030272 A1 * | 2/2003 | Johnson | F16L 29/00 |
| | | | 285/70 |
| 2003/0042734 A1 | 3/2003 | Kuwabara | |
| 2003/0062498 A1 | 4/2003 | DeCler et al. | |
| 2003/0062501 A1 | 4/2003 | DeCler | |
| 2003/0196703 A1 | 10/2003 | DeCler et al. | |
| 2004/0016900 A1 | 1/2004 | Kouda | |
| 2004/0079423 A1 | 4/2004 | Mikiya et al. | |
| 2004/0130438 A1 | 7/2004 | Garber | |
| 2004/0169368 A1 | 9/2004 | Garber et al. | |
| 2004/0173769 A1 | 9/2004 | DeCler | |
| 2004/0222180 A1 | 11/2004 | Wicks et al. | |
| 2004/0232175 A1 | 11/2004 | DeCler et al. | |
| 2005/0001425 A1 | 1/2005 | DeCler et al. | |
| 2005/0012330 A1 | 1/2005 | Schmidt | |
| 2005/0057042 A1 | 3/2005 | Wicks | |
| 2005/0076964 A1 | 4/2005 | Whall | |
| 2005/0082828 A1 | 4/2005 | Wicks et al. | |
| 2005/0084410 A1 | 4/2005 | Meyer et al. | |
| 2005/0127117 A1 | 6/2005 | deCler et al. | |
| 2005/0211934 A1 | 9/2005 | Garber et al. | |
| 2005/0237241 A1 | 10/2005 | Garber et al. | |
| 2005/0247371 A1 | 11/2005 | Chadbourne et al. | |
| 2006/0048849 A1 | 3/2006 | DeCler | |
| 2006/0076419 A1 | 4/2006 | Johnson | |
| 2006/0138704 A1 | 6/2006 | DeCler et al. | |
| 2006/0186233 A1 | 8/2006 | Holm et al. | |
| 2006/0196556 A1 | 9/2006 | Johnson | |
| 2006/0207345 A1 | 9/2006 | Rankin | |
| 2006/0231137 A1 | 10/2006 | Whall | |
| 2007/0001452 A1 | 1/2007 | Friel | |
| 2007/0025811 A1 | 2/2007 | Wilhelm | |
| 2007/0102051 A1 | 5/2007 | Zeiber et al. | |
| 2007/0169825 A1 | 7/2007 | Packham et al. | |
| 2007/0209716 A1 | 9/2007 | Rankin | |
| 2007/0259246 A1 | 11/2007 | Jang et al. | |
| 2008/0001395 A1 | 1/2008 | Kouda | |
| 2008/0011785 A1 | 1/2008 | Braun et al. | |
| 2008/0061553 A1 | 3/2008 | Schmidt | |
| 2008/0067807 A1 | 3/2008 | DeCler et al. | |
| 2008/0191069 A1 | 8/2008 | Hofmann et al. | |
| 2008/0277924 A1 | 11/2008 | Jensen et al. | |
| 2009/0021007 A1 | 1/2009 | Le Bars et al. | |
| 2009/0030387 A1 | 1/2009 | Kim et al. | |
| 2009/0051161 A1 | 2/2009 | Ekstrom | |
| 2009/0167018 A1 | 7/2009 | Lien | |
| 2009/0188575 A1 | 7/2009 | Williams et al. | |
| 2009/0256355 A1 | 10/2009 | Wicks et al. | |
| 2009/0261582 A1 | 10/2009 | Gaudin | |
| 2009/0284007 A1 | 11/2009 | Schmidt | |
| 2010/0001516 A1 | 1/2010 | Pisula, Jr. et al. | |
| 2010/0006157 A1 | 1/2010 | Gerst | |
| 2010/0006162 A1 | 1/2010 | Rankin | |
| 2010/0019487 A1 | 1/2010 | deCler et al. | |
| 2010/0043988 A1 | 2/2010 | Hofmann et al. | |
| 2010/0127492 A1 | 5/2010 | Poder et al. | |
| 2010/0155979 A1 | 6/2010 | Hofmann et al. | |
| 2010/0230950 A1 | 9/2010 | Williams et al. | |
| 2010/0295295 A1 | 11/2010 | Schmidt | |
| 2010/0301599 A1 | 12/2010 | Jensen et al. | |
| 2011/0012340 A1 | 1/2011 | Packham et al. | |
| 2011/0062701 A1 | 3/2011 | Downs et al. | |
| 2011/0121035 A1 | 5/2011 | Greter et al. | |
| 2011/0127767 A1 | 6/2011 | Wicks et al. | |
| 2011/0204621 A1 | 8/2011 | Whitaker et al. | |
| 2011/0204622 A1 | 8/2011 | Lewis et al. | |
| 2011/0210541 A1 | 9/2011 | Lewis et al. | |
| 2011/0295236 A1 | 12/2011 | Gregory | |
| 2012/0031515 A1 | 2/2012 | Whitaker | |
| 2012/0068457 A1 | 3/2012 | Pisula, Jr. et al. | |
| 2012/0161051 A1 | 6/2012 | Williams et al. | |
| 2012/0179052 A1 | 7/2012 | Wilhelm et al. | |
| 2012/0259237 A1 | 10/2012 | Axelrod | |
| 2013/0030387 A1 | 1/2013 | Williams et al. | |
| 2013/0092271 A1 | 4/2013 | Downs et al. | |
| 2013/0099489 A1 | 4/2013 | Williams et al. | |
| 2013/0207380 A1 | 8/2013 | Williams et al. | |
| 2013/0245531 A1 | 9/2013 | Brandl et al. | |
| 2013/0289517 A1 | 10/2013 | Williams et al. | |
| 2013/0320668 A1 | 12/2013 | Cheon et al. | |
| 2013/0333767 A1 | 12/2013 | Schmidt | |
| 2014/0060675 A1 | 3/2014 | Wilhelm et al. | |
| 2014/0117664 A1 | 5/2014 | Ekstrom | |
| 2014/0260554 A1 | 9/2014 | Rankin | |
| 2014/0261819 A1 | 9/2014 | Vranish | |

(56) References Cited

U.S. PATENT DOCUMENTS

| | | |
|---|---|---|
| 2015/0028586 A1 | 1/2015 | Gerst et al. |
| 2015/0076815 A1 | 3/2015 | Lombardi, III et al. |
| 2015/0090915 A1 | 4/2015 | Vranish |
| 2015/0135502 A1 | 5/2015 | Rankin et al. |
| 2015/0231369 A1 | 8/2015 | Gray et al. |
| 2015/0260325 A1 | 9/2015 | Quick |
| 2015/0276111 A1 | 10/2015 | Ira et al. |
| 2016/0018037 A1 | 1/2016 | Nichols et al. |
| 2016/0033068 A1 | 2/2016 | Wilhelm |
| 2016/0046130 A1 | 2/2016 | Burdge et al. |
| 2016/0047503 A1 | 2/2016 | Ballard et al. |
| 2016/0102791 A1 | 4/2016 | Johnson et al. |
| 2016/0208971 A1 | 7/2016 | Lewis et al. |
| 2016/0208972 A1 | 7/2016 | Lewis et al. |
| 2016/0243348 A1 | 8/2016 | Williams et al. |
| 2016/0305574 A1 | 10/2016 | Burdge |
| 2017/0009919 A1 | 1/2017 | Lewis et al. |
| 2017/0020711 A1 | 1/2017 | Nishtala et al. |
| 2017/0203089 A1 | 7/2017 | Ciccone et al. |
| 2018/0304066 A1 | 10/2018 | Ciccone et al. |
| 2019/0078714 A1 | 3/2019 | Brugger et al. |
| 2019/0167971 A1* | 6/2019 | Shevitz ................. A61M 39/10 |
| 2019/0269901 A1 | 9/2019 | Ciccone et al. |
| 2020/0188651 A1 | 6/2020 | Ciccone et al. |
| 2021/0095802 A1 | 4/2021 | Andrews et al. |
| 2022/0305249 A1 | 9/2022 | Nichols et al. |

FOREIGN PATENT DOCUMENTS

| | | |
|---|---|---|
| CA | 2 844 802 | 2/2013 |
| FR | 2 960 425 | 12/2011 |
| JP | 6214465 | 4/1987 |
| JP | 2011-075055 | 4/2011 |
| WO | 01/10362 | 2/2001 |
| WO | 2014/178861 | 11/2014 |

OTHER PUBLICATIONS

Nordson Medical. Shop Fluid Management Products. Website, https://www.nordsonmedical.com, originally downloaded Jun. 29, 2020, 3 pages.

PCT International Patent Application No. PCT/US18/21467, International Search Report and Written Opinion of the International Searching Authority dated Jun. 1, 2018, 9 pages.

PCT International Patent Application No. PCT/US2017/014189, International Search Report and Written Opinion of the International Searching Authority, mailed May 23, 2017, 13 pages total.

European Patent Application No. 16000568.2, Office Action dated Apr. 1, 2019, 7 pages.

European Patent Application No. 17741950.4, Extended European Search Report dated Sep. 9, 2019, 8 pages.

U.S. Appl. No. 62/280,354, filed Jan. 19, 2016.

U.S. Appl. No. 62/299,499, filed Feb. 24, 2016.

U.S. Appl. No. 62/468,800, filed Mar. 8, 2017.

U.S. Appl. No. 15/410,636, filed Jan. 19, 2017.

U.S. Appl. No. 15/410,636, Office Action mailed Aug. 18, 2017.

U.S. Appl. No. 15/410,636, Office Action mailed Sep. 22, 2017.

U.S. Appl. No. 15/410,636, Office Action mailed Jan. 25, 2018.

U.S. Appl. No. 15/447,033, filed Mar. 1, 2017.

U.S. Appl. No. 15/912,280, filed Mar. 5, 2018.

U.S. Appl. No. 15/912,280, Office Action mailed Dec. 17, 2018.

U.S. Appl. No. 15/912,280, Office Action mailed Apr. 23, 2019.

U.S. Appl. No. 16/024,414, Office Action mailed Dec. 18, 2019.

U.S. Appl. No. 16/024,414, Office Action mailed Jul. 24, 2020.

U.S. Appl. No. 16/503,757, Office Action mailed Aug. 15, 2019.

CPC. Aseptiquik® G Series Connectors. Specification List. Website, https://www.cpcworldwide.com, originally downloaded Mar. 28, 2023, 2 pages.

Youtube. CPC Aseptiquik G Assembly. Video, https://www.youtube.com/watch?v=XEFy0cQ6cJg, published in Year: 2017, originally downloaded Apr. 24, 2023.

Youtube. Kleenpak® Presto Sterile Connector (Pall Biotech). Video, https://www.youtube.com/watch?v=8LktNhZQras, published in Year: 2018, originally downloaded Apr. 24, 2023.

PCT International Patent Application No. PCT/US22/35669, International Search Report and Written Opinion of the International Searching Authority dated Oct. 20, 2022, 11 pages.

European Patent Application No. 17741950.4, Office Action dated Jul. 30, 2020, 5 pages.

European Patent Application No. 18763491.0, Extended European Search Report dated Dec. 16, 2020, 13 pages.

Japanese Patent Application No. 2018/537509, Official Action mailed Apr. 2, 2020, 7 pages (with English translation).

U.S. Appl. No. 16/415,640, Office Action mailed Apr. 27, 2020.

U.S. Appl. No. 16/415,640, Office Action mailed Jan. 12, 2021.

U.S. Appl. No. 16/415,640, Office Action mailed Jul. 20, 2021.

U.S. Appl. No. 16/024,414, Office Action mailed Feb. 2, 2021.

U.S. Appl. No. 16/024,414, Office Action mailed Aug. 31, 2021.

U.S. Appl. No. 16/811,223, Office Action mailed Jul. 22, 2021.

U.S. Appl. No. 16/802,412, Office Action mailed Oct. 27, 2020.

U.S. Appl. No. 17/365,085, Office Action mailed May 10, 2023.

* cited by examiner

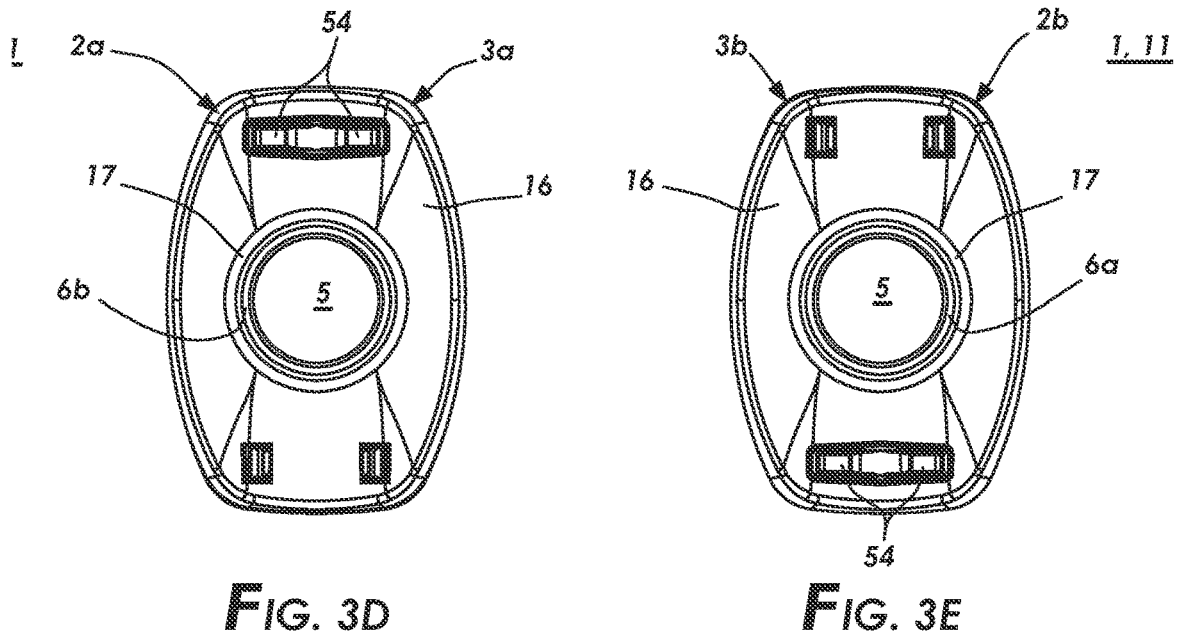
FIG. 3D          FIG. 3E
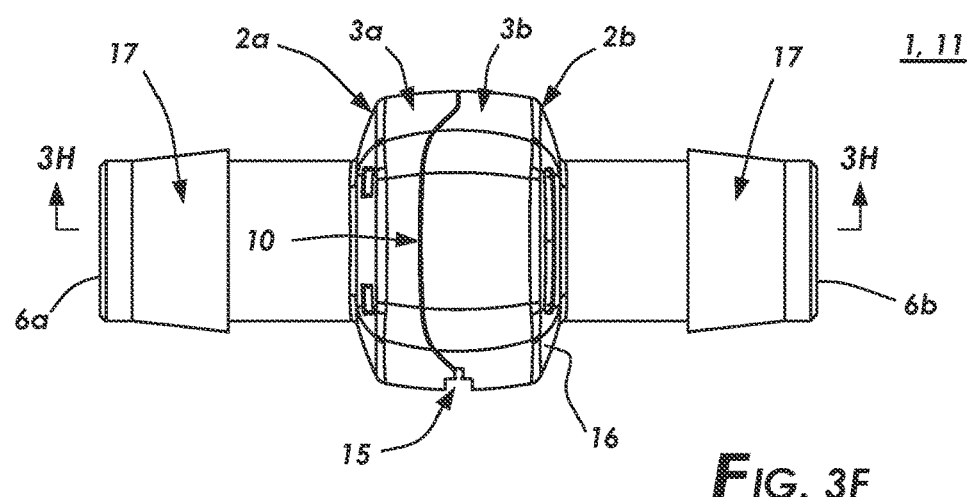
FIG. 3F
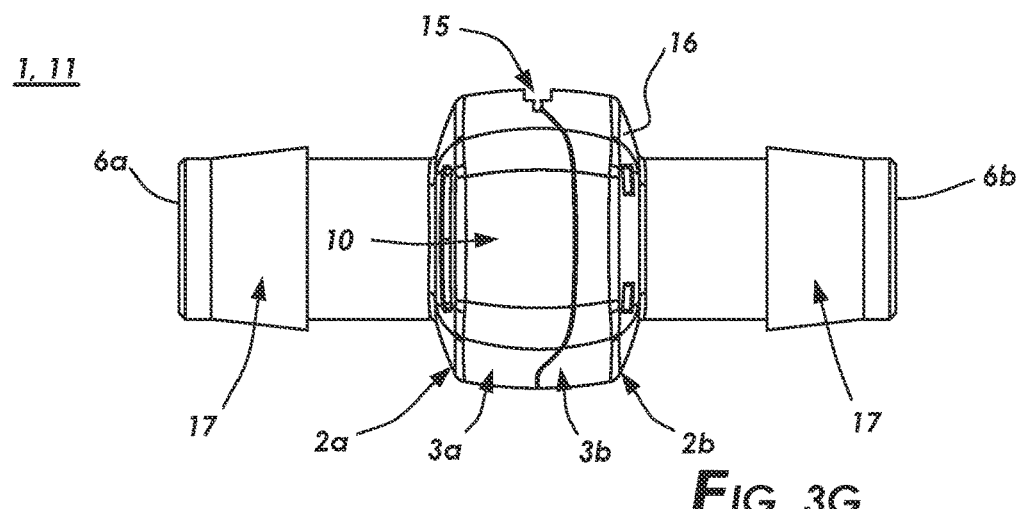
FIG. 3G

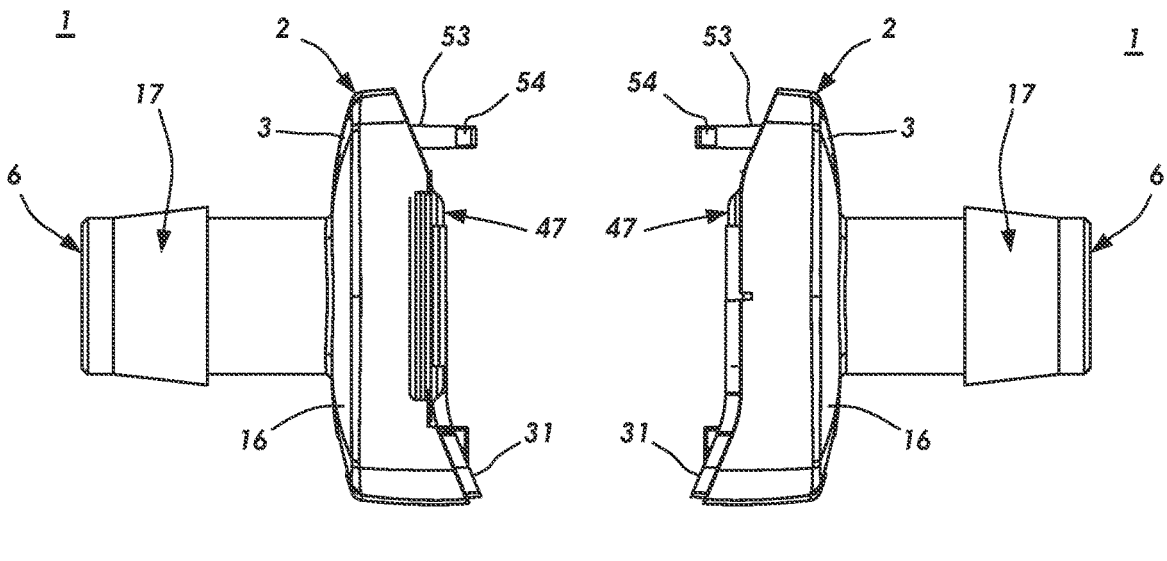
FIG. 5B        FIG. 5C
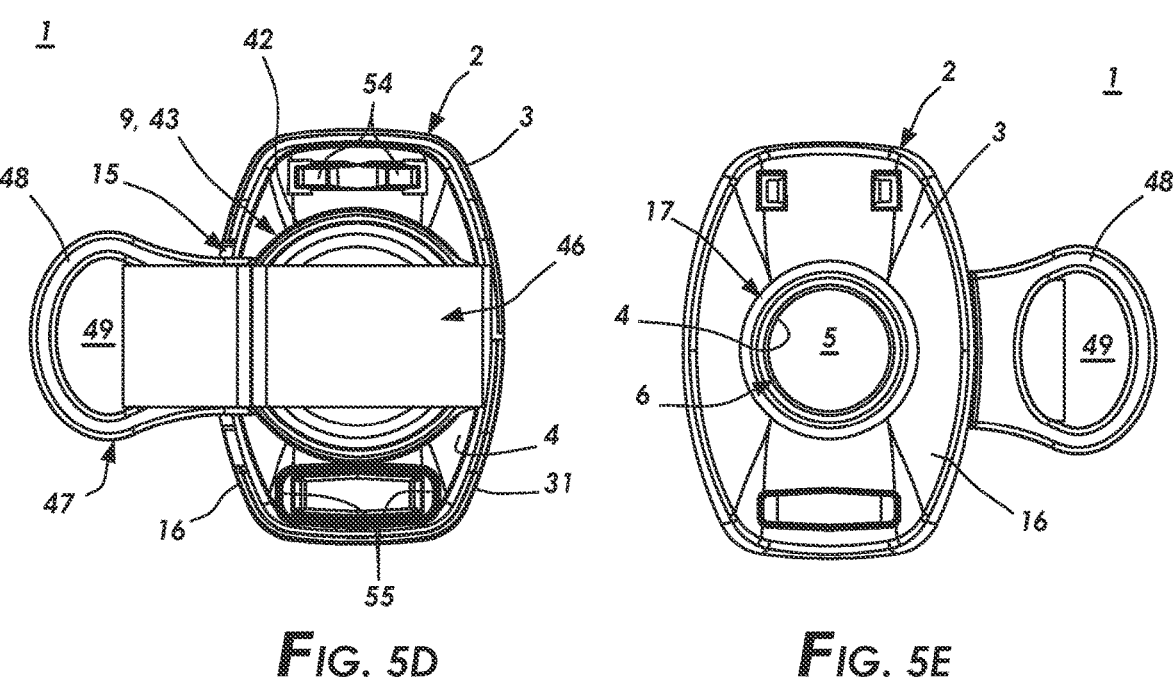
FIG. 5D        FIG. 5E

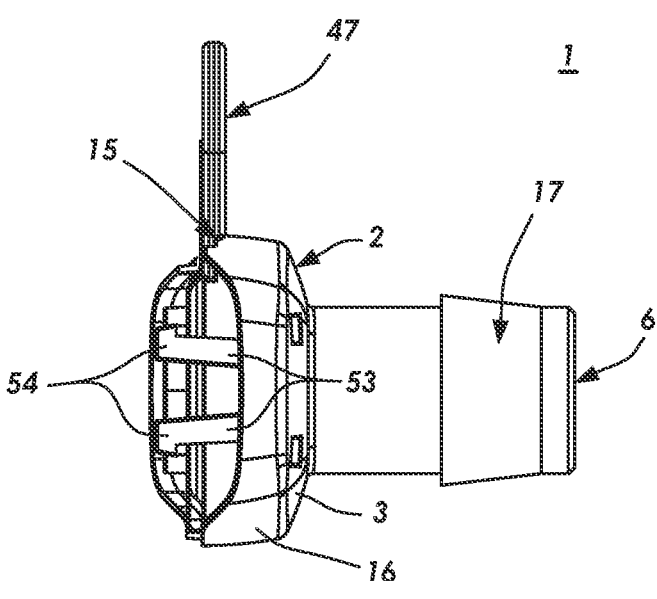
*F*IG. *5F*
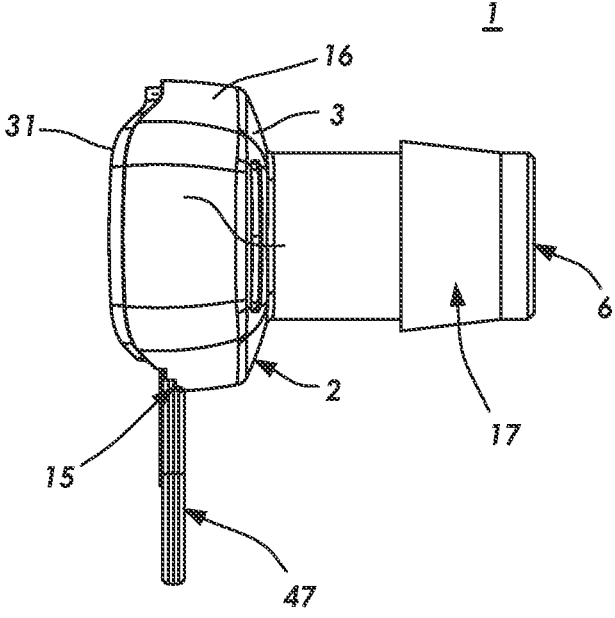
*F*IG. *5G*

GENDERLESS ASEPTIC CONNECTOR

I. FIELD OF THE INVENTION

A genderless aseptic connector system in which a plurality of connectors of substantially identical configuration each include connector housing having an internal surface defining a fluid passage between a connector end and connector housing face having an annular seal and a membrane positioned to cover the annular seal, wherein, upon engagement of a first connector housing and a second connector housing along a common juncture, a first membrane and a second membrane when correspondingly removed from a first annular seal coupled to the first connector housing and a second annular seal coupled to the second connector housing allow the first annular seal to engage the second annular seal to provide a sterile fluid passage.

II. BACKGROUND OF THE INVENTION

Connector devices can be used to connect two or more fluid passages. Conventionally, each half of a pair of mating connectors is assigned the designation male or female. The structure of the male connector is different than the structure of the female connector. The female connector receives and holds the male connector. In particular applications, each the female connector and the male connector when joined must maintain a sterile fluid passage. Typically, a line of tubing is pre-affixed to a female or male connector end having a removable membrane or valve barrier for mating to another connector end. Thus, the fluid passage remains closed and sterile even before a connection between the male connector and the female connector is made.

There would be substantial advantages in a genderless aseptic connector system including a plurality of connectors each having substantially identical structure having a fluid passage sealed with a membrane which can be released after mating two genderless connectors thereby providing a sterile fluid connection. An aseptic genderless connector can reduce the expense of labor and materials in the production process, in the supply chain, and for the consumer by the elimination of the conventional structure of mated pairs of connectors in which a first connector has only a female configuration and a second connector has only a male configuration by replacement with a single configuration of genderless connector.

In the production process of the instant inventive genderless connector only one set of production molds can yield all the parts for a single assembly process to produce the inventive genderless aseptic connector which does not require separate part identification, binning, packaging or inventory control, as required of conventional connectors which employ a discrete configuration of male connector and a discrete configuration of female connector, and which can releasably mate to provide a fluid connection.

III. SUMMARY OF THE INVENTION

Accordingly, a broad object of particular embodiments of the invention can be to provide a connector including connector housing having an internal surface defining a fluid passage between a connector end and connector housing face with an annular seal coupled to said connector housing face and a membrane positioned to cover said annular seal and coupled to said connector housing, wherein, upon engagement of a first connector housing and a second connector housing along a common juncture, a first membrane and a second membrane when correspondingly removed from a first annular seal coupled to the first connector housing and a second annular seal coupled to the second connector housing engages the first annular seal with said second annular seal to provide a sterile fluid passage.

Another broad object of particular embodiments of the invention can be to provide a method of making a connector including one or more of: obtaining a connector housing having a connector housing internal surface defining a fluid passage between a connector end and a connector housing face; coupling an annular seal to the connector housing face by engaging a tubular body external surface with a first annular member internal surface and engaging a seating face of the annular seal with a first annular member end surface to dispose a sealing face a distance outward of the first annular member end surface; and positioning a membrane to cover the annular seal with the membrane peripheral margin coupled to a second annular member end surface with the pull strip extending through a membrane passthrough of the connector housing.

Another broad object of particular embodiments of the invention can be to provide a method of using a connector including one or more of: obtaining a plurality of connectors each having substantially identical structure defining a fluid passage between a connector end and a connector housing face having an annular seal covered with a membrane; engaging a first connector housing with a second connector housing along a common juncture with a corresponding first pull strip and a second pull strip extending through a membrane passthrough to afford an aseptic coupling of the first connector with the second connector; removing the first membrane and the second membrane correspondingly covering the first annular seal of the first connector and the second annular seal of the second connector by applying a pulling force to the first pull strip and the second pull strip extending through the membrane passthrough; and engaging a first annular seal with a second annular seal to produce a sterile fluid passage.

Naturally, further objects of the invention are disclosed throughout other areas of the specification, drawings, photographs, and claims.

IV. BRIEF DESCRIPTION OF THE DRAWINGS

FIG. 3D is a first end elevation view of a particular embodiment of a pair of connectors aseptically coupled to provide a sterile fluid passage.

FIG. 3E is a second end elevation view of a particular embodiment of a pair of connectors aseptically coupled to provide a sterile fluid passage.

FIG. 3F is a top plan view of a particular embodiment of a pair of connectors aseptically coupled to provide a sterile fluid passage.

FIG. 3G is bottom plan view of a particular embodiment of a pair of connectors aseptically coupled to provide a sterile fluid passage.

FIG. 5B is first side elevation view of a connector having connector housing face coupled to an annular seal covered with a removable membrane.

FIG. 5C is second side elevation view of a connector having connector housing face coupled to an annular seal covered with a removable membrane.

FIG. 5D is first end elevation view of a connector having connector housing face coupled to an annular seal covered with a removable membrane.

FIG. 5E is second end elevation view of a connector having connector housing face coupled to an annular seal covered with a removable membrane.

FIG. 5F is top plan view of a connector having connector housing face coupled to an annular seal covered with a removable membrane.

FIG. 5G is bottom plan view of a connector having connector housing face coupled to an annular seal covered with a removable membrane.

V. DETAILED DESCRIPTION OF THE INVENTION

Figure 1:
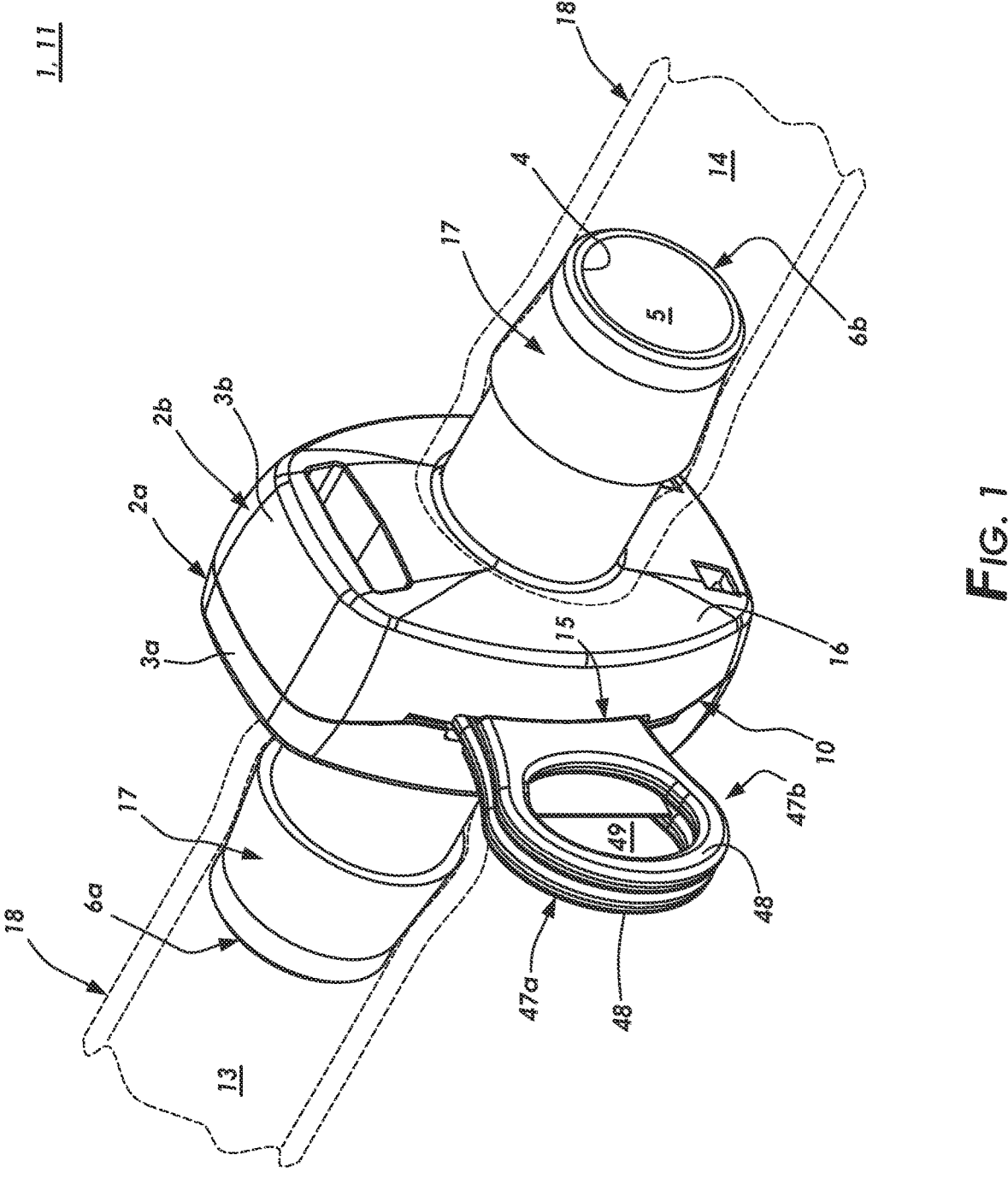
FIG. 1 is perspective view of a particular embodiment of an aseptic coupling of a pair of connectors each having an annular seal covered by a removable membrane, with a fluid conduit connected to a connector end shown in broken line.

Generally, referring to FIGS. 1, 2, 3A-3H, 4, 5A-4G, and 6A-C a connector system (1) can include a plurality of connectors (2) of substantially identical structure each including a connector housing (3) having a connector housing internal surface (4) defining a fluid passage (5) between a connector end (6) and a connector housing face (7). An annular seal (8) can be coupled to the connector housing face (7) and a membrane (9) can be positioned to cover the annular seal (8) and coupled to the connector housing face (7). A first connector housing (3a) can be engaged to a second connector housing (3b) along a common juncture (10) to afford an aseptic coupling (11) of a first connector (2a) with a second connector (2b). The first membrane (9a) and the second membrane (9b), when correspondingly removed from covering a first annular seal (8a) coupled to the first connector housing face (7a) and from covering a second annular seal (8b) coupled to the second connector housing face (7b), engages the first annular seal (8a) with the second annular seal (8b). The first annular seal (8a) engaged with the second annular seal (8b) affords a sterile fluid passage (12).

For the purposes of this invention, the term "aseptic" means any process that maintains a sterilized surface or volume.

For the purposes of this invention, the term "sterile" or "sterilized" or "sterilizing" means being free or a process of freeing, to a specified degree, a surface or volume from contaminants. Examples of contaminants include, but are not necessarily limited to, inorganic particles and organic particles; bodily tissues, fluids, or excrements; liquids fluids; microorganisms such as bacteria, archaea, fungi, protozoa, and viruses.

Sterility of embodiments of the invention and the components thereof, can be achieved using one or more sterilization techniques, including gamma irradiation, E-beam, ethylene oxide (EtO), and/or autoclave technologies. The membrane (9) positioned to cover the annular seal (8) and coupled to the connector housing (3) maintains the sterility of the fluid passage (5).

Now, with primary reference to FIG. 1, an illustrative embodiment the connector system (1) can further include a first apparatus (13) (shown in broken line) fluidically coupled to a first connector end (6a) and a second apparatus (14) (shown in broken line) fluidically coupled to a second connector end (6b). The first connector (2a) can have a substantially identical configuration to the second connector (2b). The first connector (2a) can have a first connector housing (3a) and the second connector (2b) can have a second connector housing (3b). The first connector housing (3a) and the second connector housing (3b) can be engaged along a common juncture (10) to afford an aseptic coupling (11) of a first connector (2a) with a second connector (2b).

Figure 2:
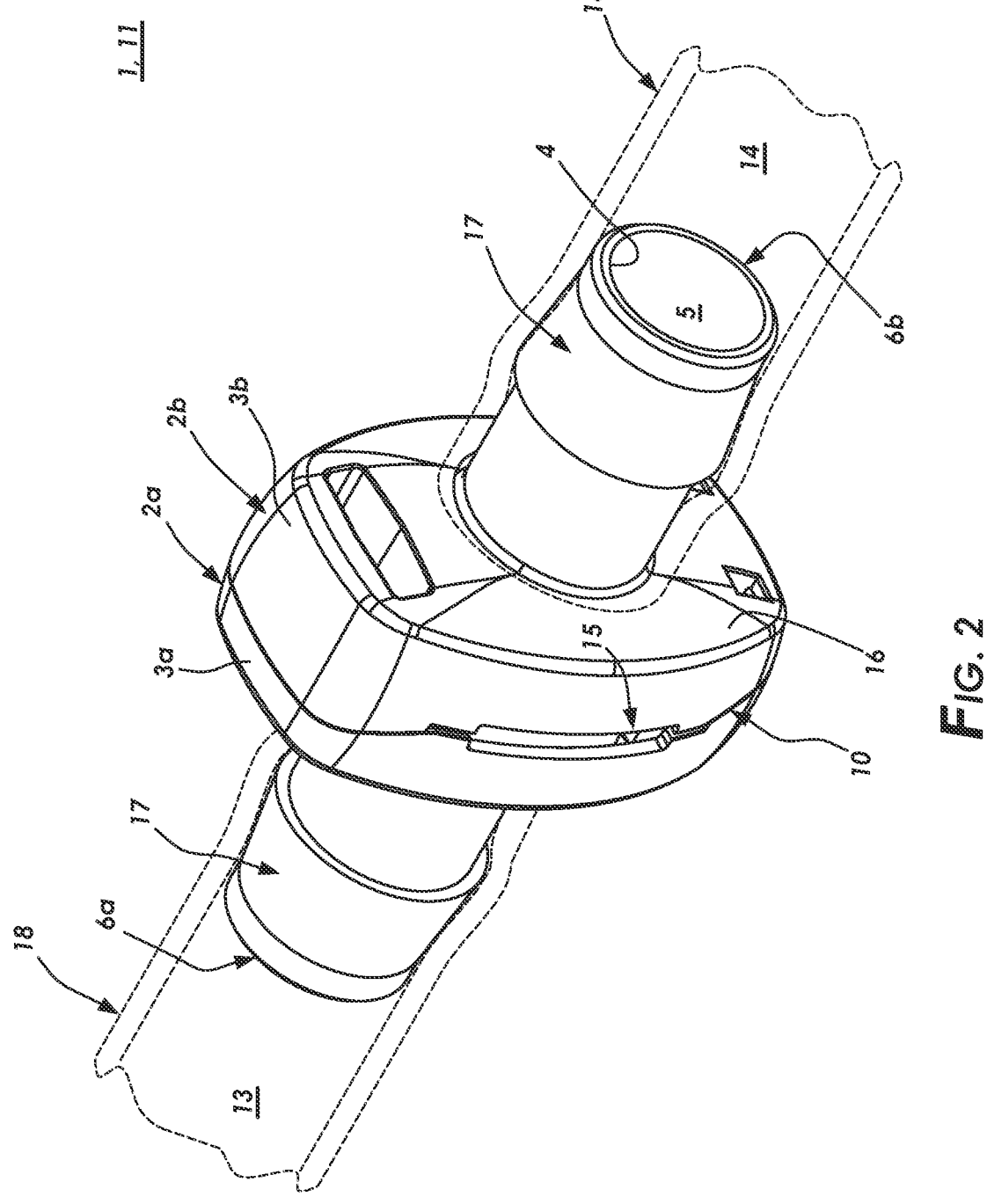
FIG. 2 is perspective view of a particular embodiment of an aseptic coupling of a pair of connectors each having an annular seal engaged by removal of the membrane covering each annular seal to provide a sterile fluid passage, with a fluid conduit connected to a connector end shown in broken line.

Now, with primary reference to FIG. 2, in illustrative embodiment of the connector system (1) the first membrane (9a) and the second membrane (9b) can be correspondingly removed from the first annular seal (8a) coupled to said first connector housing face (7a) and a second annular seal (8b) coupled to said second connector housing face (7b) to engage the first annular seal (8a) with said second annular seal (8b) to afford a sterile fluid passage (12) between the first apparatus (13) (shown in broken line) fluidically coupled to a first connector (2a) and a second apparatus (14) (shown in broken line) fluidically coupled to the second connector (2b).

Now, with primary reference to FIGS. 3A through 3G, which depict an illustrative embodiment of the connector system (1) in which a first connector housing (3a) of substantially identical configuration engages a second connector housing (3b) along a common juncture (10) to afford the sterile fluid passage (12) of a first connector (2a) with a second connector (2b), the common juncture (10) can, but need not be, planar. In the illustrative example, the mirror symmetry between the first connector (2a) and the second connector (2b) is rotated 180 degrees to allow the first connector (2a) and the second connector (2b) to join along the common juncture (10). This also aligns the mated halves of a membrane passthrough (15) depicted in FIGS. 2, 3B, 3F, and 3G.

Again, with primary reference to FIGS. 3A through 3G, in particular embodiments, the connector housing external surface (16) proximate the connector end (6) can be configured with a connection fitting (17) that allows the connector (2) to be connected to a fluid conduit (18) such as a tube or a hose (as shown in the examples of FIG. 1 and FIG. 2); however, this is not intended to preclude the use of other types of connection fittings (17), such as, push to connect configuration, compression tube configuration, luer configuration, or luer lock configuration, or the like.

Figure 3A:
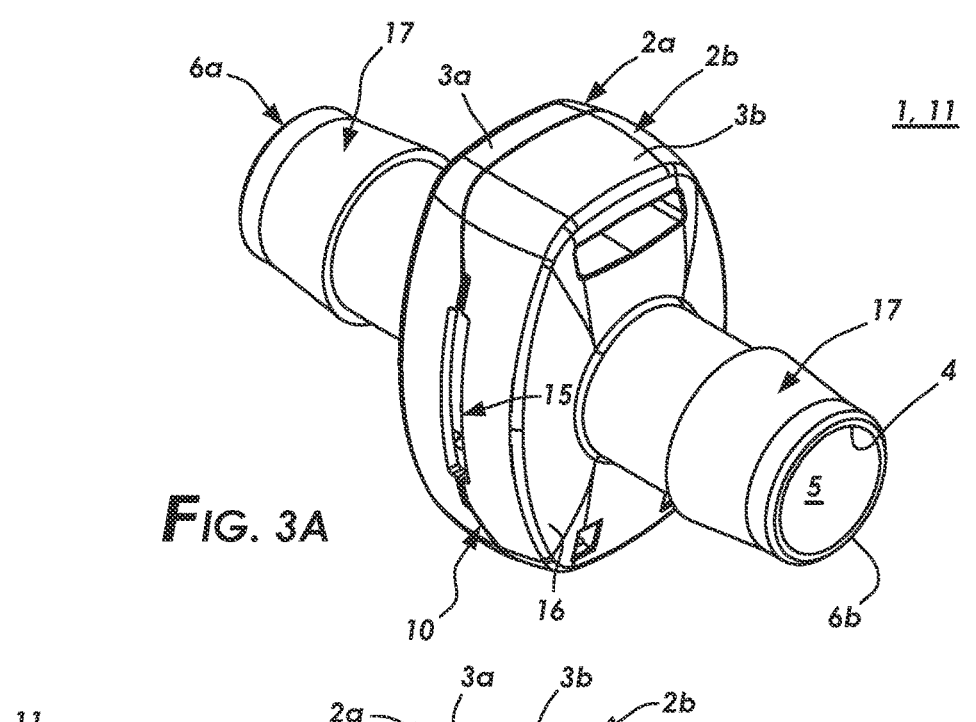
FIG. 3A is perspective view of a particular embodiment of a pair of connectors aseptically coupled to provide a sterile fluid passage.
Figure 3B:
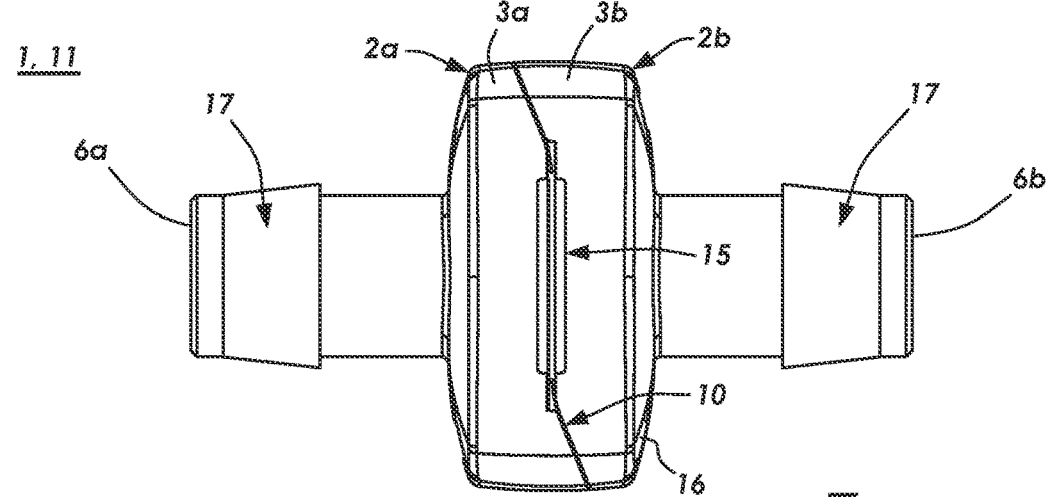
FIG. 3B is a first side elevation view of a particular embodiment of a pair of connectors aseptically coupled to provide a sterile fluid passage.
Figure 3C:
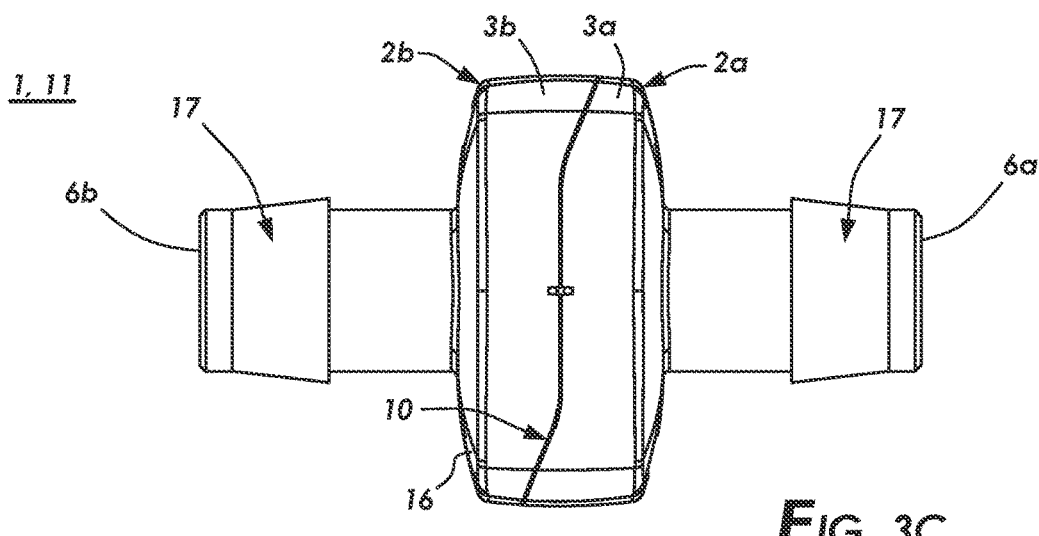
FIG. 3C is a second side elevation view of a particular embodiment of a pair of connectors aseptically coupled to provide a sterile fluid passage.
Figure 3H:
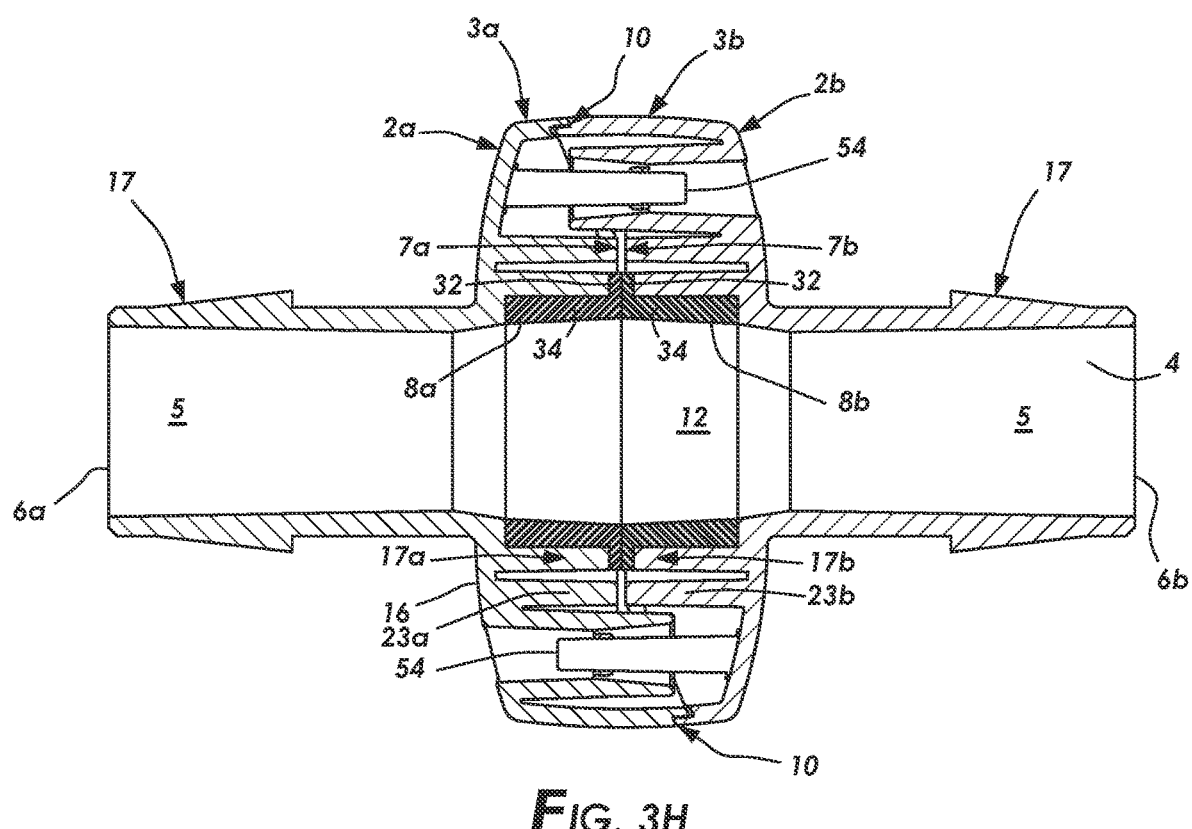
FIG. 3H is a cross section view H-H as shown in FIG. 3F of a particular embodiment of a pair of connectors aseptically coupled to provide a sterile fluid passage.

Now, with primary reference to FIG. 3H, which depicts a cross section view of the cross section H-H as shown in FIG. 3F, wherein upon engagement of the first connector housing (3a) and the second connector housing (3b) along the common juncture (10) and the first membrane (9a) and the second membrane (9b) are correspondingly removed from a first annular seal (8a) coupled to the first connector housing face (7a) and a second annular seal (8b) coupled to the second connector housing face (7b), the first annular seal (8a) engages the second annular seal (8b) to afford the sterile fluid passage (12). The first annular seal (8a) engaged to the second annular seal (8b), can under normal use be liquid tight or airtight depending on the application.

Figure 4:
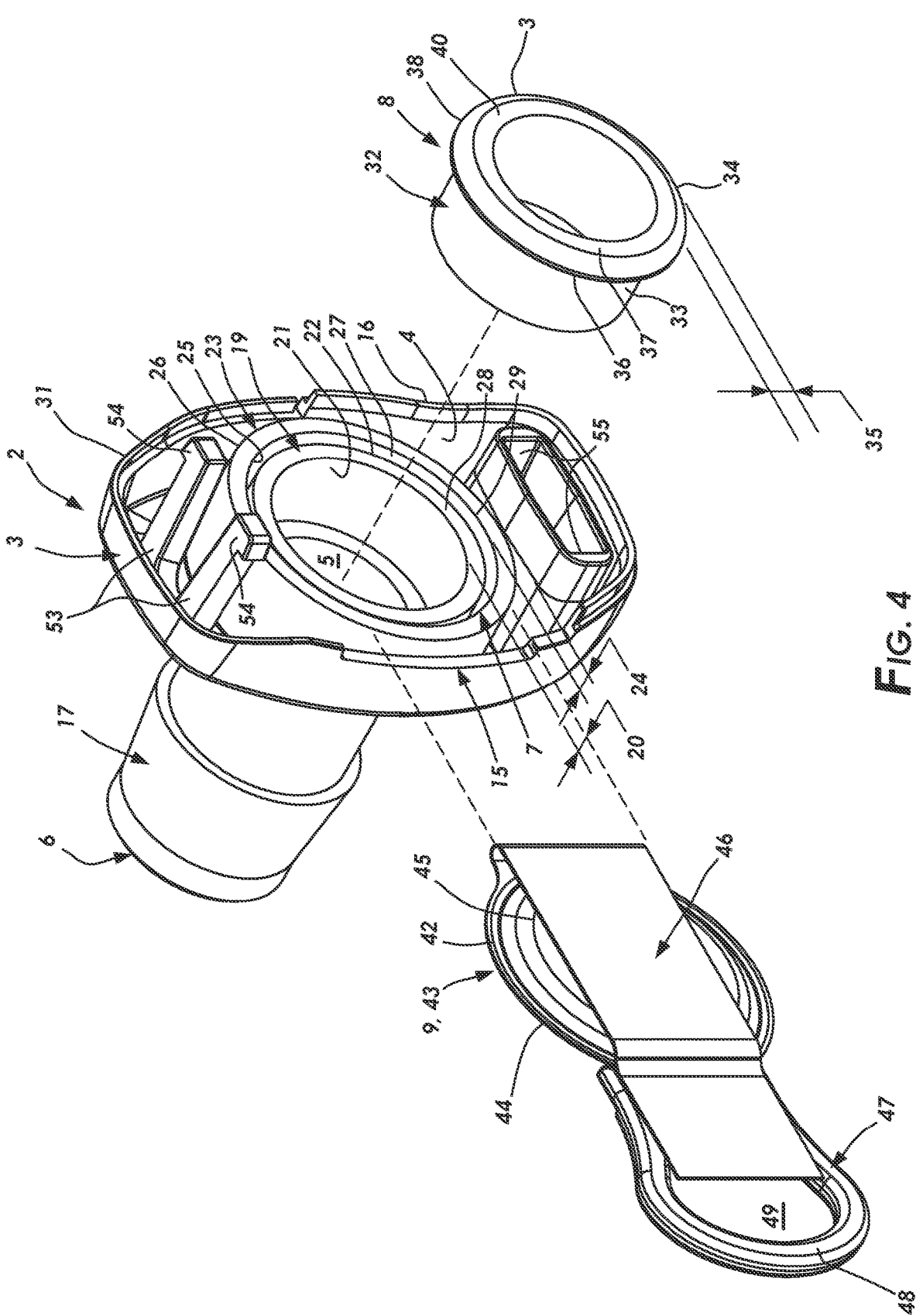
FIG. 4 is an exploded view of a connector having connector housing face coupled to an annular seal covered with a removable membrane.

Now, with primary reference to FIG. 4, an exploded view depicts the components of a particular embodiment of one of a plurality of connectors (2) each having substantially identical structure, wherein each includes one or more of: a connector housing (3), an annular seal (8) and a membrane (9). The connector housing (3) comprises a connector housing internal surface (4) defining a fluid passage (5) between a connector end (6) and a connector housing face (7). In the example of FIG. 4, the connector housing internal surface (4) defining the fluid passage (5) terminates in a first annular member (19) having a first annular member wall thickness (20) disposed between a first annular member internal surface (21) and a first annular member external surface (22). A second annular member (23) having a second annular member wall thickness (24) disposed between a second annular member internal annular surface (25) and a second annular member external annular surface (26) can be disposed in fixed circumferential spatial apart relation about the first annular member (19) defining a fixed annular space (27) between the first annular member external surface (22) and the second annular member internal surface (25). The first and second annular members (19, 23) can be disposed in fixed concentric spatial relation having annular member end surfaces (28, 29) terminating at a common plane defining a connector housing face (7). In particular embodiments, the first and second annular members (19, 23) can be formed as one annular member (19/23) having a greater annular member wall thickness (20/24) or as one annular member having an annular member radially extending annular lip (30) (depicted in broken line). The connector housing (3) extends about the connector housing face (7) to terminate in a connector housing outer edge (31), wherein a first connector housing outer edge (31a) of a first connector housing (3a) and a second connector housing outer edge (31b) of a second connector housing (3b) having substantially identical configuration engage along the common juncture (10). The connector housing(s) (3, 3a 3b) can be made, molded, or formed from a polymeric material. As examples of polymeric materials suitable for use, the polymeric material can be one or more of: polycarbonate, polyethylene, polypropylene, polystyrene, and polyetheretherketone.

Again, with primary reference to FIG. 4, a particular embodiment of the annular seal (8) can comprise a tubular body (32) having an external tubular body surface (33) configured to engage the first annular member internal surface (21) and having an annular lip (34) circumferentially radially extending from the tubular body (32) having a seal thickness (35) disposed between a seating face (36) and a sealing face (37). The seating face (36) can be configured to engage the first annular member end surface (28) between the first annular member internal surface (21) and the first annular member external surface (22) when the tubular body external surface (33) engages the first annular member internal surface (21). In particular embodiments, the sealing face (37) can take the form of an annular truncated cone (38) that tapers from an annular lip periphery (39) to a substantially flat annular sealing surface (40) disposed in a plane substantially parallel to the seating face (36). The substantially flat annular sealing surface (40) radially extends from about the tubular body internal surface (41) to about the tubular body external surface (33) to join external surface of the annular truncated cone (38). The annular lip (34) has a seal thickness (35) sufficient to engage a first annular seal (8a) with a second annular seal (8b) upon engagement of a first connector housing outer edge (31a) of a first connector housing (3a) and a second connector housing outer edge (31b) of a second connector housing (3b) having substantially identical configuration along a common juncture (10). Embodiments of the annular seal (8) having an annular truncated cone (38) configuration axially supported by an annular member end surface (28) and the tubular body (32) can afford substantial advantages in affording a fluid tight or airtight seal. The axial forces generated during engagement of a first annular seal (8a) with a second annular seal (8b) can be transmitted to the tubular body (32) of the first and second annular seal (8a, 8b) and also spread radially to the portions of the annular lip (34) of the first and second annular seal (8a, 8b) supported by the first annular member end surfaces (28, 29) which affords a pair of spatially fixed surfaces between which the annular lips (34) can be engaged and receive compression forces with greater uniformity and/or greater magnitude to afford an improved axial compression performance and enhanced sealing under pressure as compared to conventional seals which may only transmit compression force to the respective seal bodies. Additionally, engagement and compression of the annular lips (34) further assures that the flow through the first and second annular seals (8a, 8b) is not restricted by unintended deformation of the tubular body under compression. The annular seal (8) can be made, formed or molded from one or more of: a neoprene, a nitrile, an ethylene propylene monomer, a silicone rubber, Viton®, a styrene butadiene rubber, a butyl rubber, a natural rubber, a polyurethane rubber, and a food grade rubber.

Again, with primary reference to FIG. 4, in particular embodiments, a membrane (9) can be configured to cover the annular seal (8), in part or in whole, with a membrane peripheral margin (42) coupled to the connector housing (3). In the example of FIG. 4, the membrane (9) entirely covers the sealing face (37) of the annular seal (8) with the membrane peripheral margin (42) extending outside of the annular lip (34) allowing the membrane peripheral margin (42) to be coupled to the second annular member end surface (29). There can be an advantage in this configuration because the membrane (9) can cover the entirety of the sealing face (37) of the annular seal (8), but need not be otherwise affixed or adhered to any portion of the sealing face (37), thereby assuring that the sealing face (37) remains free of any adhesive, or other connecting element that may contaminate or deform the sealing face (37) upon removal of the membrane (9). The membrane peripheral margin (42) can define a substantially circular membrane peripheral margin; however, this does not preclude a configuration of the peripheral margin that defined other than a circular membrane, such as an oval, a rectangle, a square or other configuration that can cover the membrane and be removably coupled to the connector housing (3). The membrane peripheral margin (42) can be coupled in whole or in part along the membrane peripheral margin (42) to the connector housing (3). In the illustrative example, the membrane (9) is coupled along the entirety of the membrane peripheral margin (42) to the second annular member end surface (29) as shown in the examples of FIGS. 4A through 4G.

In particular embodiments, the membrane (9) can comprise one layer (43) of one material. The one layer of material can afford pores of sufficient size to allow a permeate flow through the membrane while filtering out contaminates. The average pore size can be between about 0.05-0.4 μm. The membrane pore size can be selected to filter out microorganisms. Typically, microorganisms range in size from about 1 μm to about 2 μm in diameter and from about 2 μm to about 8 μm in length.

A wide variety of materials can be suitable as one layer (43) of material, as illustrative examples: a polyethylene terephthalate (PET) film, a polytetrafluoroethylene (PTFE), a polyethylene (PE), a fluorocarbon elastomer (FKM), a polyethersulfone (PES), a metal foil, an aluminum foil, and Tyvek®. In the examples of FIGS. 4 and 4A-4G, the membrane (9) comprises one layer of polytetrafluoroethylene (PTFE).

The one layer (43) of membrane material and the connector housing material can be selected to allow the membrane material to be heat staked to the connector housing (3) during production and to allow the membrane (9) to be manually peeled when used from the connector housing. In other embodiments, the one layer (43) can further include a bonding layer (44) adapted to couple the one layer (43) of the membrane (9) to the connector housing (3). The bonding layer (44) can comprise an adhesive layer, a heat staking layer, and a weldable layer, or combinations thereof. The bonding layer (44) can be affixed to the entire surface of the membrane (9) or delimited to the membrane peripheral margin (42). In particular embodiments, the membrane (9) can comprise a plurality of layers of the same or different materials.

Again, with primary reference to FIG. 4, in particular embodiments, the membrane (9) can include a concave curvature (45) facing the annular seal (8). In particular embodiments, the concave curvature (45) can terminate at the membrane peripheral margin (42) leaving the membrane peripheral margin (42) substantially flat to allow ready coupling of the membrane peripheral margin (42) to the second annular member end surface (29). There are substantial advantages in a membrane (9) having a concave curvature (45) due to one or more of: less interference between the membrane (9) and the annular seal (8) during assembly of the connector (2), the annular seal (8) can have a greater seal thickness (35) between the seating face (36) and the sealing face (37), and the membrane peripheral margin (42) more readily aligns for coupling with the second annular member end surface (29).

The concave curvature (45) can be produced by applying pressure to the membrane (9) positioned in a concave mold to conform the membrane (9) to the concave shape of the concave mold. The pressure can be applied to the surface of the membrane (9) as a gas pressure with or without a vacuum to the opposite surface of the membrane (9) to conform the membrane (9) to the shape of the concave mold. Alternately, pressure can be applied by convex mold surface which presses the membrane between the concave mold surface and the convex mold surface. In particular embodiments, the concave mold and/or the membrane (9) can be heated to temperature at which it can be conformed to the shape of the concave mold under pressure.

Again, with primary reference to FIG. 4, in particular embodiments, a pull strip (46) can be coupled to membrane (9). The pull strip (46) can be configured to extend through the membrane passthrough (15) of the connector housing (3). The pull strip (46) can be made from the same material(s) or different material(s) from which the membrane (9) is made. In certain instances, the pull strip (46) and the membrane (9) can comprise one integral piece. The pull strip (46) can be coupled to a portion of the membrane peripheral margin (42). In particular embodiments, the pull strip (46) couples to membrane periphery margin (42) distal from the membrane passthrough (15) in the connector housing (3) and folds to overlay the membrane (9) to extend outward of membrane passthrough (15) in the connector housing (3). There can be an advantage in coupling the pull strip (46) to the membrane periphery margin (42) distal from the membrane passthrough (15) in the connector housing (3). In this configuration, the pull force to detach the membrane periphery margin (42) from the connector housing (3) or the second annular member end surface (29) can be reduced, and the pull force moves the membrane (9) outward from the annular seal (8) reducing the likelihood of damage to the annular seal (8).

Again, with primary reference to FIG. 4, embodiments of the membrane (9) can further include a pull tab (47) connected to the pull strip (46). The pull tab (47) can be made from the same material(s) or different material(s) from the membrane (9). In certain instances, the pull tab (47) and the membrane (9) can comprise one integral piece. The pull tab (47) can be configured as a ring (48) with a ring passthrough (49).

Now, with primary reference to FIGS. 4A through 4G, an embodiment of the connector (2) can be made by obtaining a connector housing (3) having a connector housing internal surface (4) defining a fluid passage (4) between a connector end (6) and connector housing face (7). An annular seal (8) can be coupled to the connector housing (3) by engaging a tubular body external surface (33) with the first annular member internal surface (21) and engaging the seating face (36) of the annular seal (8) with the first annular member end surface (28) to dispose the sealing face (37) a distance outward of the first annular member end surface (28). The membrane (9) can be positioned to cover the annular seal (8) and the membrane peripheral margin (42) coupled to the second annular member end surface (29) with the pull strip (46) extending through the membrane passthrough (15). The assembled connector (2) can be sterilized using one or more sterilization techniques, including gamma irradiation, E-beam, ethylene oxide (EtO), and/or autoclave technologies. The sterilized connector (2) can have the connector end (6) coupled to a first apparatus (13) (shown in broken line in FIG. 1) to provide an aseptic fluid passage (50) between the first apparatus (13) and the annular seal (8) covered by the membrane (9).

Now, with primary reference to FIGS. 5A through 5G, in particular embodiments, the connector housing (3) can further include a first fastening part (51) and a second fastening part (52). The first fastening part (51) of said first connector (2a) and the second connector (2b) corresponding connect with the second fastening part (52) of the first connector (2a) and the second connector (2b) to fasten the first connector housing outer edge (31a) of the first connector (2a) and the second connector housing outer edge (31b) of the second connector (2b) in fixed spatial relation along the common juncture (10). In particular embodiments, the first fastening part (51) can comprise a pair of resiliently flexible catch members (53) disposed in fixed spaced apart relation and each extending outward of said of the connector housing (3) to terminate in corresponding pair of catch ends (54). In particular embodiments, the second fastening part (52) can comprise a pair of projecting members (55) coupled to connector housing (3) in opposed fixed spaced apart relation. The pair of catch ends (54) of the first connector housing (3a) and the second connector housing (3b) can be configured to slide between the pair of projecting members (55) of the first connector housing (3a) and the second connector housing (3b) to mateably secure to the pair of projecting members (55) of the first and second connector housing (3a, 3b) to maintain engagement of said first connector housing (3a) and the second connector housing (3b) along the common juncture (10).

Figure 5A:
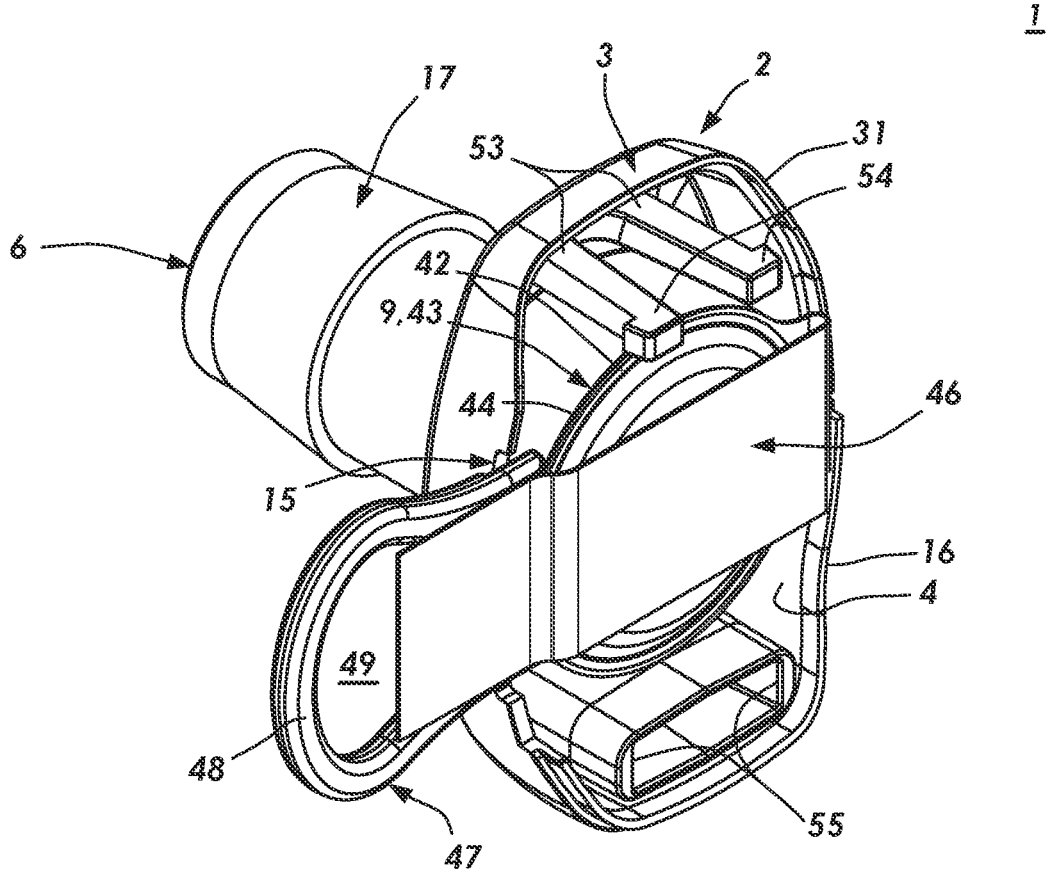
FIG. 5A is a front perspective view of a connector having connector housing face coupled to an annular seal covered with a removable membrane.
Figures 6A, 6B, 6C:
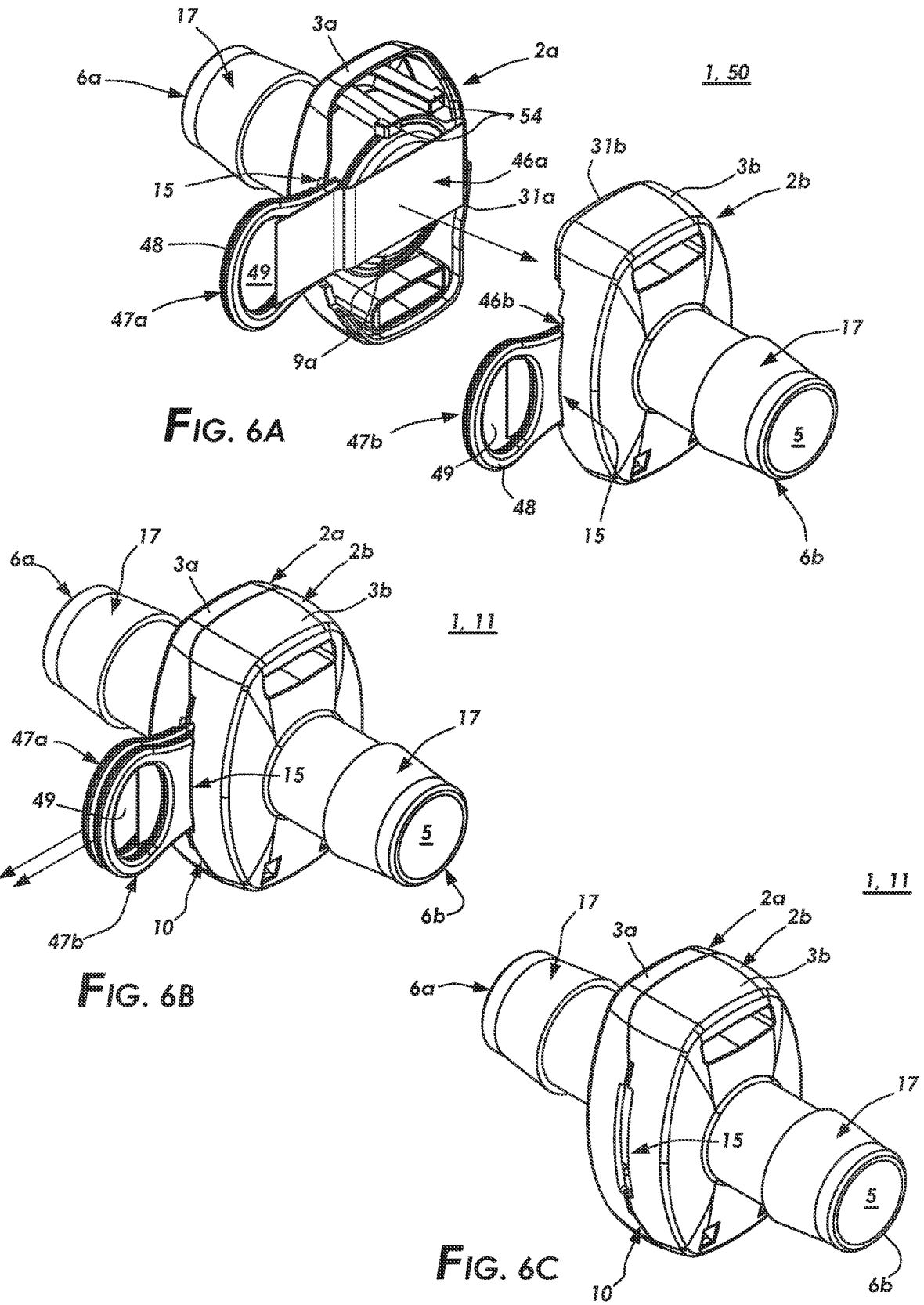
FIG. 6A illustrates a method of aseptic coupling of a first connector and a second connector each having a connector having connector housing face coupled to an annular seal covered with a removable membrane.
FIG. 6B illustrates a method of removing the membranes covering the annular seals of the first connector aseptically coupled to a second connector.
FIG. 6C illustrates a first connector aseptically coupled to a second connector to provide a sterile fluid passage.

Now, with primary reference to FIGS. 6A through 6C, which depicts a particular method of obtaining a sterile fluid passage (12). The method can include one or more of: obtaining a plurality of connectors (2) each having substantially identical structure which defines a fluid passage (5) sealed with a membrane (9) (as shown in the example of FIG. 5A). The method can further include engaging a first connector housing (3a) with a second connector housing (3b) along a common juncture (10) with a corresponding first pull strip (46a) and a second pull strip (46b) extending through the membrane passthrough (15) to afford an aseptic coupling (11) of a first connector (3a) with a second connector (3b) (as shown in the example of FIG. 5B). The method can further include removing the first membrane (9a) and second membrane (9b) correspondingly covering the first annular seal (8a) of the first connector (2a) and the second annular seal (8b) of the second connector (2b) by applying a pulling force to the first pull strip (46A) and the second pull strip (46B) extending through the membrane passthrough (15) (as shown in the example of FIG. 5C). The method can further include engaging a first annular seal (9A) with a second annular seal (9B) to produce a sterile fluid passage (12) (as shown in the example of FIG. 5C).

As can be easily understood from the foregoing, the basic concepts of the present invention may be embodied in a variety of ways. The invention involves numerous and varied embodiments of a connector and methods for making and using such connector including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "connector" should be understood to encompass disclosure of the act of "connecting"—whether explicitly discussed or not—and, conversely, were there is a disclosure of the act of "connecting", such a disclosure, should be understood to encompass disclosure of a "connector" and even a "means for connecting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled", or derivatives thereof, can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the couplers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A connector, comprising:
a connector housing having an internal surface defining a fluid passage between a connector end and connector housing face;
a first annular seal abutting said connector housing face; and
a membrane positioned to cover said first annular seal, said membrane connected to said connector housing,
wherein, upon engagement of a first connector housing and a second connector housing along a common juncture, a first membrane and a second membrane when correspondingly removed from said first annular seal abutting said first connector housing face and a second annular seal abutting said second connector housing face engages said first annular seal against said second annular seal.

2. The connector of claim 1, wherein said first annular seal comprises:
a tubular body configured to engage said internal surface of said of said fluid passage of said connector housing; and
an annular lip circumferentially radially extending from said tubular body to engage said connector housing face, said annular lip having a thickness sufficient to engage said first annular seal with said second annular seal.

3. The connector of claim 1, wherein said first annular seal engages said second annular seal in a fluid tight seal between said fluid passage of said first connector housing and said fluid passage of said second connector housing.

4. The connector of claim 1, wherein said membrane entirely covers said first annular seal.

5. The connector of claim 4, wherein said membrane includes a peripheral margin coupled to said connector housing.

6. The connector of claim 5, wherein said peripheral margin of said membrane coupled to said connector housing along the entirety of said peripheral margin.

7. The connector of claim 6, said peripheral margin of said membrane is heat staked to said connector housing along the entirety of said peripheral margin.

8. The connector of claim 4, wherein said peripheral margin of said membrane is heat staked to said connector housing.

9. The connector of claim 1, wherein said membrane comprises one layer.

10. The connector of claim 1, wherein said one layer comprises polytetrafluoroethylene (PTFE).

11. The connector of claim 1, further comprising a pull strip coupled to said membrane.

12. The connector of claim 11, wherein said pull strip is directly connected to said peripheral margin of said membrane coupled to said connector housing, said pull strip folds to overlay said membrane and extend outward of said connector housing.

13. The connector of claim 12, further comprising a pull tab connected to said pull strip.

14. The connector of claim 1, wherein said connector housing extends about said connector housing outlet face coupled to said first annular seal to terminate in connector housing outer edge.

15. The connector of 14, wherein a first connector housing outer edge of said first connector housing and a second connector housing outer edge of said second connector housing having substantially identical configuration engage along a common juncture.

16. The connector of claim 14, further comprising a first fastening part and a second fastening part coupled to said connector housing, wherein said first fastening part of said first connector and said second connector corresponding connect with said second fastening part of said first connector and said second connector to engage said first connector housing outer edge of said first connector and said second connector housing outer edge of said second connector housing along said common juncture.

17. The connector of claim 16, wherein said first fastening part comprises a pair of resiliently flexible catch members disposed in fixed spaced apart relation and each extending outward of said of said connector housing to terminate in corresponding pair of catch ends.

18. The connector of claim 17, wherein said second fastening part comprises a pair of projecting members coupled to said connector housing and disposed in opposed fixed spaced apart relation.

19. The connector of claim 18, wherein said pair of catch ends of said first connector housing and said second connector housing configured to slide between said pair of projecting members of said first connector housing and said second connector housing to mateably secure to said pair of projecting members of said first and second connector housing to maintain engagement of said first connector housing and said second connector housing along said common juncture.

20. A connector, comprising
   a connector housing having an internal surface defining a fluid passage between a connector end and connector housing face;

an annular seal coupled to said connector housing face; and a membrane positioned to cover said annular seal,
   wherein said membrane coupled to said connector housing,
   wherein said membrane having a concave curvature facing said annular seal,
   wherein, upon engagement of a first connector housing and a second connector housing along a common juncture, a first membrane and a second membrane when correspondingly removed from a first annular seal coupled to said first connector housing face and a second annular seal coupled to said second connector housing face engages said first annular seal with said second annular seal.

*   *   *   *   *